US010626041B2

(12) United States Patent
Okada (10) Patent No.: US 10,626,041 B2
(45) Date of Patent: Apr. 21, 2020

(54) CONTROL DEVICE AND MANUFACTURING APPARATUS OF OPTICAL FIBER

(71) Applicant: FUJIKURA LTD., Koto-ku, Tokyo (JP)

(72) Inventor: Kenji Okada, Sakura (JP)

(73) Assignee: FUJIKURA LTD., Tokyo (JP)

( * ) Notice: Subject to any disclaimer, the term of this patent is extended or adjusted under 35 U.S.C. 154(b) by 106 days.

(21) Appl. No.: 15/837,289

(22) Filed: Dec. 11, 2017

(65) Prior Publication Data

US 2018/0099893 A1    Apr. 12, 2018

Related U.S. Application Data

(62) Division of application No. 15/175,222, filed on Jun. 7, 2016, now Pat. No. 9,873,630.

(30) Foreign Application Priority Data

Jun. 9, 2015 (JP) .................................. 2015-116629

(51) Int. Cl.
| | | |
|---|---|---|
| *C03B 37/025* | (2006.01) | |
| *C03B 37/03* | (2006.01) | |
| *C03C 25/12* | (2006.01) | |

(52) U.S. Cl.
CPC ........ *C03B 37/0253* (2013.01); *C03B 37/032* (2013.01); *C03C 25/12* (2013.01); *C03B 2205/42* (2013.01); *Y02P 40/57* (2015.11)

(58) Field of Classification Search
CPC ................ C03B 37/025–0279; C03B 2205/42
See application file for complete search history.

(56) References Cited

U.S. PATENT DOCUMENTS

| 2003/0000255 A1 | 1/2003 | Kohmura et al. |
| 2009/0139269 A1 | 6/2009 | Filippov et al. |
| (Continued) | | |

FOREIGN PATENT DOCUMENTS

| CN | 100345782 C | 10/2007 |
| CN | 101541695 A | 9/2009 |
| (Continued) | | |

OTHER PUBLICATIONS

Communication dated May 28, 2018, from the State Intellectual Property Office of People's Republic of China in counterpart Application No. 201610390870.3.
Machine Translation of JP 02-051439 A; Published on Feb. 21, 1990; dated Dec. 11, 2017.
Singh, "Process Control Concepts, Dynamics, and Applications", PHI Learning Private Limited, 2009m pp. 63 and 64.
(Continued)

*Primary Examiner* — Lisa L Herring
(74) *Attorney, Agent, or Firm* — Sughrue Mion, PLLC (57) ABSTRACT

A control device which is used in a manufacturing apparatus of an optical fiber, the manufacturing apparatus including a drawing unit and a coating unit. The control device includes: one or a plurality of non-contact holding portions which hold the bare optical fiber at any position between the drawing unit and the coating unit; a position detection unit; and a control unit which controls a flow rate of a fluid introduced into the non-contact holding portion on the basis of the floating position detected by the position detection unit. The non-contact holding portion comprises a guide groove. The control unit detects the floating position of the bare optical fiber at at least one of the non-contact holding portions, compares the detected floating position with a predetermined reference floating position, and controls a flow rate of the fluid introduced into the non-contact holding portions.

4 Claims, 5 Drawing Sheets

(56) References Cited

U.S. PATENT DOCUMENTS

| | | | |
|---|---|---|---|
| 2009/0217710 A1 | 9/2009 | Costello, III et al. |
| 2011/0239709 A1 | 10/2011 | Okada |
| 2011/0274404 A1 | 11/2011 | Okada |
| 2016/0229136 A1 | 8/2016 | Okada |

FOREIGN PATENT DOCUMENTS

| | | | |
|---|---|---|---|
| CN | 102245522 A | 11/2011 |
| EP | 0999189 A1 | 5/2000 |
| JP | 62-3037 A | 1/1987 |
| JP | 2-51439 A | 2/1990 |
| JP | 2010-510957 A | 4/2010 |
| JP | 5571958 B2 | 8/2014 |
| JP | 5917736 A | 5/2016 |
| WO | 2004/042486 A1 | 5/2004 |
| WO | 2008/066661 A2 | 6/2008 |
| WO | 2009/108315 A2 | 9/2009 |

OTHER PUBLICATIONS

An Office Action dated Jun. 2, 2017, which issued during the prosecution of U.S. Appl. No. 15/017,813.
Astrom et al., "PID Controllers, 2nd Edition", Instrument Society of America, 1995, (pp. 5, 6, 59-70).
Communication dated Feb. 21, 2017, from the United States Patent and Trademark Office in counterpart U.S. Appl. No. 15/017,813.
Communication dated Jul. 28, 2015, from the Japanese Patent Office in counterpart Japanese application No. 2015-024688.
Communication dated Mar. 22, 2016, from the Japanese Patent Office in counterpart Japanese application No. 2015-024688.
Non-Final Office Action dated May 15, 2017 in parent U.S. Appl. No. 15/175,222.
Yao Chonghua, "Environmental Engineering Simulation and Control", Higher Education Press, Jul. 2010, p. 141, paragraph 1.
Yu Minghui, "Integrated Wiring Technology and Engineering", Higher Education Press, Jun. 2008, p. 48, paragraph 3.
Communication dated Nov. 30, 2017, from the State Intellectual Property Office of People's Republic of China in counterpart Application No. 201610079611.9.

CONTROL DEVICE AND MANUFACTURING APPARATUS OF OPTICAL FIBER

CROSS REFERENCE TO RELATED APPLICATIONS

This application is a Divisional of U.S. application Ser. No. 15/175,222, filed on Jun. 7, 2016, claiming priority benefit from Japanese Patent Application No. 2015-116629, filed on Jun. 9, 2015, the contents of which are incorporated herein by reference.

BACKGROUND OF THE INVENTION

Field of the Invention

The present invention relates to a manufacturing method, a control device, and a manufacturing apparatus of an optical fiber.

Description of Related Art

In general, in order to manufacture an optical fiber, a fiber drawing method of drawing an optical fiber vertically downward from an optical fiber preform along a straight path is employed.

Figure 6:
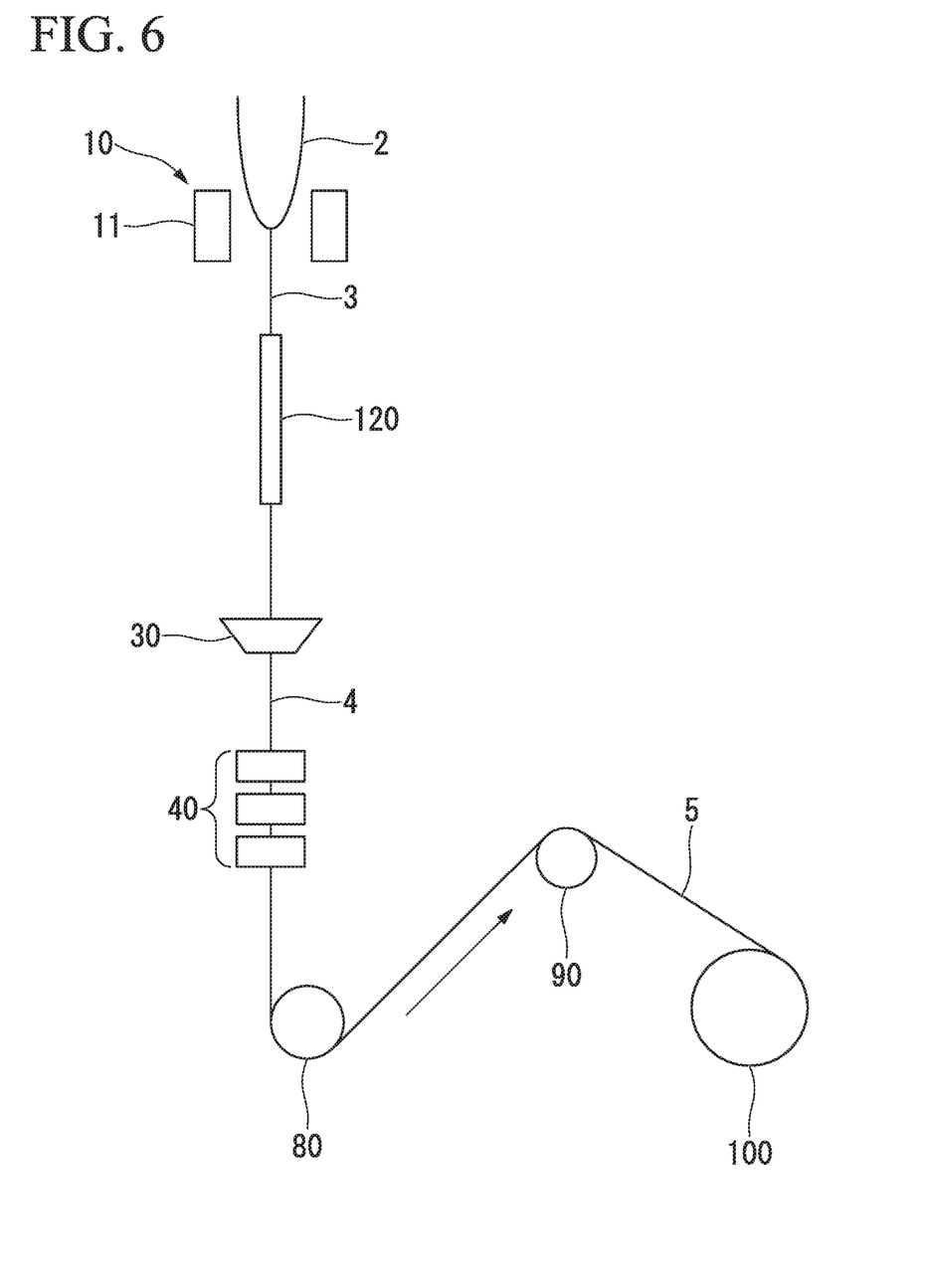
FIG. 6 is a schematic view showing an example of a manufacturing apparatus of an optical fiber in the related art.

For example, in order to manufacture an optical fiber 5 using a manufacturing apparatus shown in FIG. 6, an optical fiber preform 2 is melted by a heating furnace 11 of a drawing unit 10 and a bare optical fiber 3 is drawn vertically downward therefrom through drawing. The bare optical fiber 3 is cooled by a cooling unit 120 and is thereafter provided with a coating layer by a coating unit 30, thereby obtaining an optical fiber intermediate body 4. The coating layer of the optical fiber intermediate body 4 is cured by a curing unit 40, thereby obtaining an optical fiber 5. The optical fiber 5 is wound by a winder 100 via a pulley 80 and a take-up unit 90.

Regarding a manufacturing method thereof, as a factor that affects productivity, there is a restriction on the height of the entire system. The height of the system is the main factor in the restriction of productivity because there is a need to ensure a sufficient distance for cooling the bare optical fiber obtained by drawing of the optical fiber preform.

When a new facility including a building is established, such restriction can be relaxed. However, this requires an enormous cost. When the enhancement of productivity is further required in the future, there is need to establish a new facility at a higher cost.

As a method of relaxing such restriction, there is a method of using a direction conversion tool having a non-contact holding mechanism.

The non-contact holding mechanism is a mechanism for holding an object under the pressure of a fluid such as air in a non-contact manner, and a direction changing device (non-contact holding portion) having the mechanism can change the direction of the bare optical fiber without coming into contact with the bare optical fiber (bare fiber).

When the direction changing device is used, the direction of the bare optical fiber drawn from the optical fiber preform along a first path can be changed to follow a second path that is different from the first path (for example, refer to Japanese Patent No. 5571958 and Japanese Unexamined Patent Application, First Publication No. S62-003037).

Japanese Patent No. 5571958 discloses a manufacturing method of an optical fiber in which a direction conversion tool that has a groove, into which an optical fiber is introduced, and has an opening formed in the groove is used. In this method, gas introduced into the tool through an inflow port is ejected from the opening such that the optical fiber is changed in direction in a state in which the optical fiber is floated by the pressure of the gas.

A direction changing device described in Japanese Unexamined Patent Application, First Publication No. S62-003037 has a guide groove which guides the bare optical fiber, and gas outlets are formed at the bottom surface and both side surfaces of the guide groove (see Example and FIGS. 3 and 4). In the manufacturing method using the direction changing device, the direction of the optical fiber is changed in a state in which the optical fiber is floated by the pressure of the gas blown from the four outlets.

The floatation amount of the bare optical fiber is determined by the balance between the pressure of the gas blown from the inside of the groove of the non-contact holding mechanism, a drawing tension applied to the bare optical fiber, and the like. Therefore, when conditions such as the flow velocity of the gas at the non-contact holding mechanism and drawing tension of the bare optical fiber are constant, the floatation amount of the bare optical fiber becomes constant, resulting in stable drawing.

However, in an actual manufacturing process, due to a variation in the outer diameter of the optical fiber preform, a variation in the drawing velocity of the bare optical fiber, and a decrease in the remaining length of the optical fiber preform, a variation of drawing tension during drawing occurs. As a result, the floatation amount of the bare optical fiber may be varied.

When the floatation amount of the bare optical fiber is varied, oscillation (variation) of the bare optical fiber increases in a groove of the tool. Therefore, there is concern that the bare optical fiber may come into contact with the inner surface of the groove of the tool. When the bare optical fiber comes into contact with the tool, the bare optical fiber is damaged, and there is a possibility that the strength thereof may decrease.

In addition, when the floating position of the bare optical fiber is changed in the non-contact holding mechanism, the position of the bare optical fiber introduced into the coating unit provided on the downstream side of the non-contact holding mechanism varies, and there is concern that the thickness of the coating may become uneven.

The present invention has been made taking the foregoing circumstances into consideration, and provides a manufacturing method, a control device, and a manufacturing apparatus of an optical fiber which achieve the stabilization of a floating position of a bare optical fiber at a non-contact holding portion.

SUMMARY OF THE INVENTION

A first aspect of the present invention is a manufacturing method of an optical fiber. The method includes drawing an optical fiber preform and forming a bare optical fiber, coating an outer circumference of the bare optical fiber with a coating layer including a resin, and holding the bare optical fiber using one or a plurality of non-contact holding portions at any position between a position where the bare optical fiber is formed and a position where the coating is performed. The non-contact holding portion includes a guide groove which guides the bare optical fiber, and an internal space portion into which a fluid is introduced from an outside, in the guide groove, an outlet through which the fluid in the internal space portion is blown to float the bare optical fiber in the guide groove is formed, and a floatation position of the bare optical fiber at at least one of the non-contact holding portions is detected, the detected floatation position and a predetermined reference floatation position are compared, and a flow rate of the fluid introduced into the non-contact holding portions is controlled such that a deviation between the detected floatation position and the reference floatation position is reduced.

In a second aspect of the present invention according to the manufacturing method of an optical fiber of the first aspect described above, it is preferable that the reference floating position is set on the basis of a standard deviation of the floating amount of the bare optical fiber determined by a preliminary test.

In a third aspect of the present invention according to the manufacturing method of an optical fiber of the first aspect or the second aspect described above, when a floatation amount of the bare optical fiber becomes greater than a floatation amount at the reference floating position and a standard deviation of the floatation amount of the bare optical fiber is greater than a standard deviation at the reference floating position, it is preferable that a flow rate of the fluid introduced into the non-contact holding portions is decreased.

In a fourth aspect of the present invention according to the manufacturing method of an optical fiber of the first aspect or the second aspect described above, when a floatation amount of the bare optical fiber becomes smaller than a floatation amount at the reference floating position and a standard deviation of the floatation amount of the bare optical fiber is greater than a standard deviation at the reference floating position, it is preferable that a flow rate of the fluid introduced into the non-contact holding portions is increased.

A fifth aspect of the present invention is a control device which is used in a manufacturing apparatus of an optical fiber. The manufacturing apparatus includes a drawing unit which draws an optical fiber preform and forms a bare optical fiber, and a coating unit which coats an outer circumference of the bare optical fiber with a coating layer comprising a resin. The control device includes one or a plurality of non-contact holding portions which hold the bare optical fiber at any position between the drawing unit and the coating unit, a position detection unit which detects a floating position of the bare optical fiber in the non-contact holding portion, and a control unit which controls a flow rate of a fluid introduced into the non-contact holding portion on the basis of the floating position detected by the position detection unit. The non-contact holding portion includes a guide groove which guides the bare optical fiber and an internal space portion into which the fluid is introduced from the outside. In the guide groove, an outlet through which the fluid in the internal space portion is blown to float the bare optical fiber in the guide groove is formed. The control unit detects the floating position of the bare optical fiber at at least one of the non-contact holding portions, compares the detected floating position with a predetermined reference floating position, and controls a flow rate of the fluid introduced into the non-contact holding portions so as to reduce the difference between the detected floating position and the predetermined reference floating position.

In a sixth aspect of the present invention according to the control device of the fifth aspect described above, the reference floating position is set on the basis of a standard deviation of the floating amount of the bare optical fiber determined by a preliminary test.

In a seventh aspect of the present invention according to the control device of the fifth aspect or the sixth aspect described above, when a floatation amount of the bare optical fiber becomes greater than a floatation amount at a reference floating position and a standard deviation of the floatation amount of the bare optical fiber is greater than a standard deviation at the reference floating position, the control unit decreases a flow rate of the fluid introduced into the non-contact holding portions.

In an eighth aspect of the present invention according to the control device of the fifth aspect or the sixth aspect described above, when a floatation amount of the bare optical fiber becomes smaller than a floatation amount at a reference floating position and a standard deviation of the floatation amount of the bare optical fiber is greater than a standard deviation at the reference floating position, the control unit increases a flow rate of the fluid introduced into the non-contact holding portions.

A ninth aspect of the present invention is a manufacturing apparatus of an optical fiber includes the control device according to any one of the fifth aspect to the eighth aspect described above, the drawing unit which draws an optical fiber preform and forms the bare optical fiber, and the coating unit which coats the outer circumference of the bare optical fiber with the coating layer comprising the resin.

According to the aspect of the present invention, the detected floating position and the predetermined reference floating position are compared and the flow rate of the fluid introduced into the direction changing devices is controlled so as to reduce the difference between the detected floating position and the predetermined reference floating position. Therefore, the floatation amount of the bare optical fiber 3 can be adjusted, and variation of the floatation amount can be reduced.

In detail, in the floatation amount of the bare optical fiber, there are large variation of the floatation amount due to the variation of the drawing tension and fine variation of the floatation amount due to fine oscillation of the bare optical fiber. In the the present invention, both of the two variations of the floatation amount can be reduced by controlling the flow rate of the introduced fluid.

Therefore, the contact between the bare optical fiber and an inner side surface of the guide groove due to an insufficient floatation amount caused by a variation in the outer diameter of the bare optical fiber can be avoided.

Therefore, the bare optical fiber is not damaged by the non-contact holding portion, and the operation ratio of the manufacturing apparatus is increased, resulting in an enhancement of productivity. Therefore, a reduction in manufacturing costs can be achieved. In addition, the optical fiber can be manufactured with a good yield.

Furthermore, a floating position of the bare optical fiber at the non-contact holding portion becomes stable, and thus the position of the bare optical fiber that enters the coating unit becomes constant. Therefore, the coating is prevented from having an uneven thickness, and the optical fiber with stable quality can be manufactured.

DETAILED DESCRIPTION OF THE PREFERRED EMBODIMENTS

Figure 1:
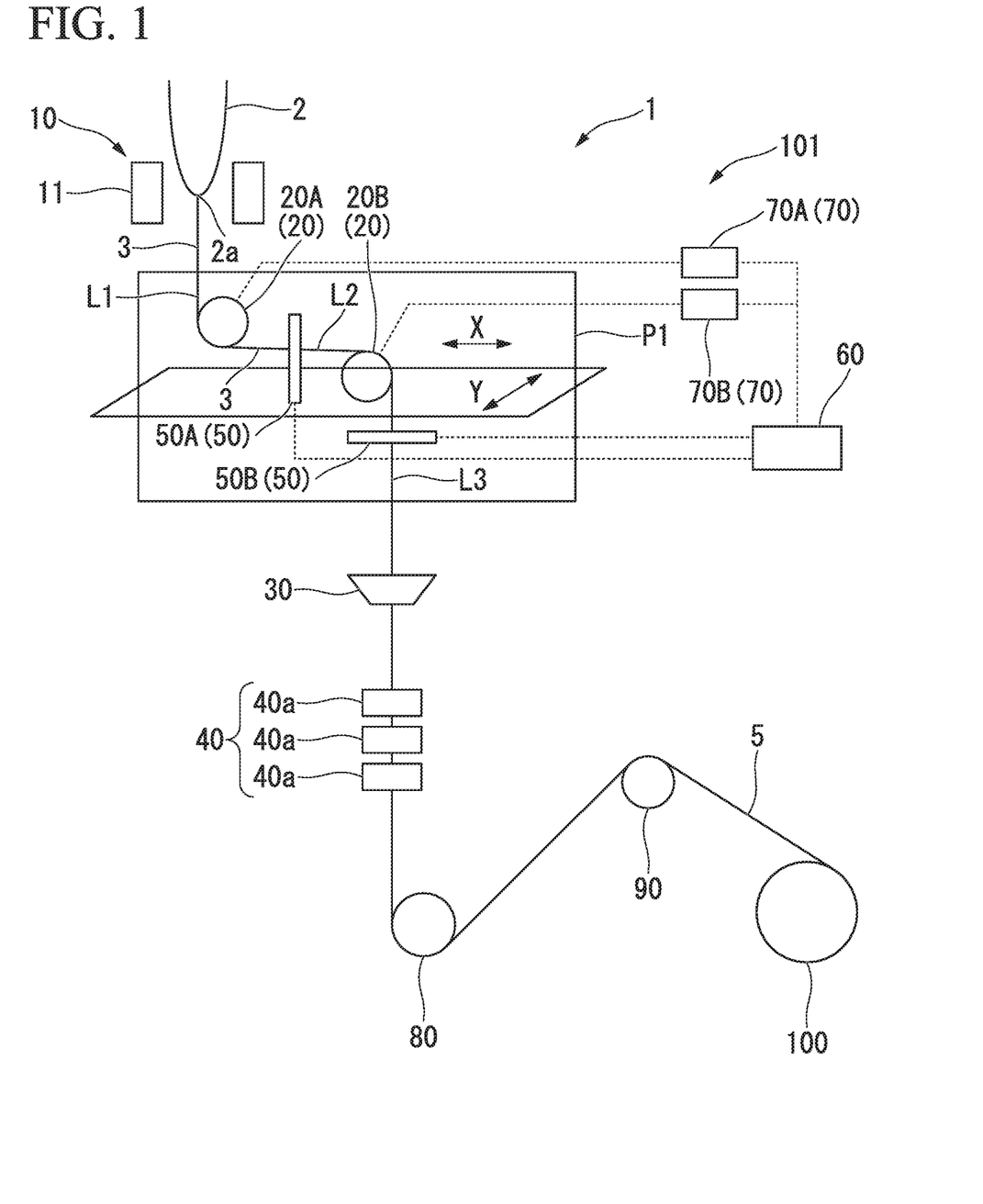
FIG. 1 is a schematic view showing the schematic configuration of an embodiment of a manufacturing apparatus of an optical fiber of the present invention.

FIG. 1 is a schematic view showing the schematic configuration of a manufacturing apparatus 1 which is an embodiment of a manufacturing apparatus of an optical fiber according to the present invention.

The manufacturing apparatus 1 includes, in the order from the upstream side toward the downstream side in a drawing direction, a drawing unit 10, direction changing devices 20 (20A and 20B), a coating unit 30, a curing unit 40, a position detection unit 50 (50A and 50B), a control unit 60, flow rate regulators 70 (70A, 70B), a pulley 80, a take-up unit 90, and a winder 100.

The direction changing devices 20, the position detection unit 50, the control unit 60, and the flow rate regulators 70 constitute a control device 101.

A downstream direction in a drawing direction is not a constant direction. After the direction of the bare optical fiber 3 is changed by the direction changing device 20, the changed direction is the downstream direction.

The drawing unit 10 includes a heating furnace 11, and an optical fiber preform 2 is heated by the heating furnace 11 to form a bare optical fiber 3 through drawing.

A tip end portion 2a is the tip end portion of a narrowed portion (neck-down) of the optical fiber preform 2 which is heated and melted.

The direction changing device (non-contact holding portion) 20 changes the direction of the bare optical fiber 3. In the manufacturing apparatus 1 shown in FIG. 1, the two direction changing devices 20 are used. The direction changing devices 20 include the first direction changing device (first non-contact holding portion) 20A and the second direction changing device (second non-contact holding portion) 20B in the order from the upstream side to the downstream side in the drawing direction.

The first direction changing device 20A allows the bare optical fiber 3 drawn vertically downward (first path L1) from the optical fiber preform 2 to be changed in direction by 90° and be directed horizontally (second path L2).

A plane including the first path L1 and the second path L2 is referred to as P1. An X direction is a direction along the second path L2 in the plane P1, and a Y direction is a direction perpendicular to the plane P1.

The second direction changing device 20B allows the bare optical fiber 3 to be directed vertically downward (third path L3) by changing the direction of the bare optical fiber 3 by 90°.

Hereinafter, the structure of the direction changing device 20 will be described.

Figure 3:
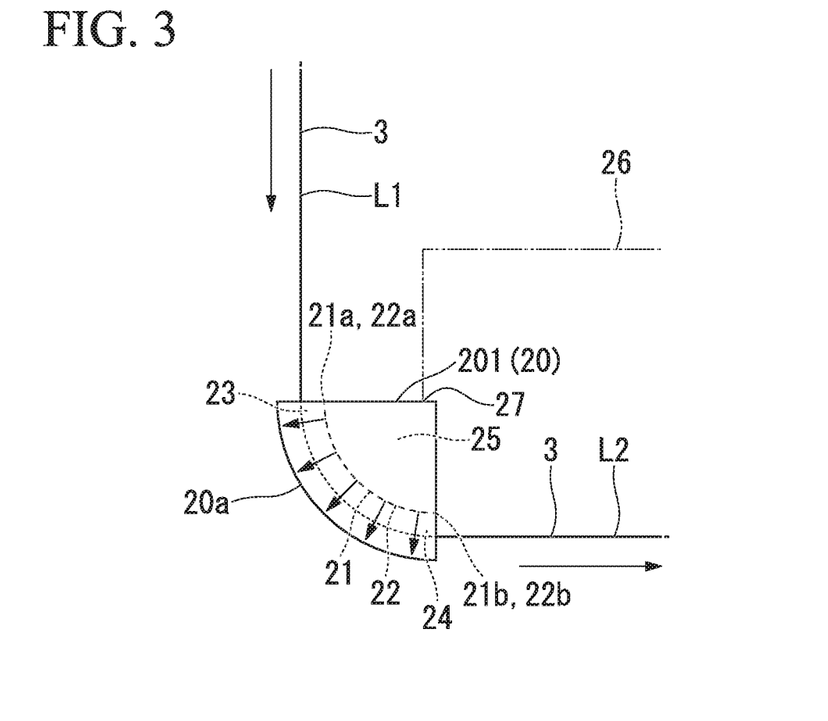
FIG. 3 is a front view showing an example of the direction changing device.

A direction changing device 201 shown in FIG. 3 is a first example of the direction changing device 20, and can change the direction of the bare optical fiber 3 by 90°.

The direction changing device 201 is formed in a quadrant shape in a plan view, and has a guide groove 21 formed in an outer circumferential surface 20a along the entire circumferential length. The direction changing device 201 is provided in a posture such that the center axis direction thereof is coincident with the Y direction, and a radial direction R (see FIG. 2) is directed along the plane P1 (see FIG. 1). Here, a direction along the outer circumferential surface 20a having an arc shape in the plan view is referred to as a circumferential direction.

In the bottom portion of the guide groove 21, an outlet 22 for a fluid (air or the like) for floating the bare optical fiber 3 disposed along the guide groove 21 is formed along the guide groove 21. The outlet 22 is formed over the entire length of the guide groove 21.

One end 22a of the outlet 22 reaches a first end 21a of the guide groove 21, and a second end 22b reaches the other end 21b.

Figure 2:
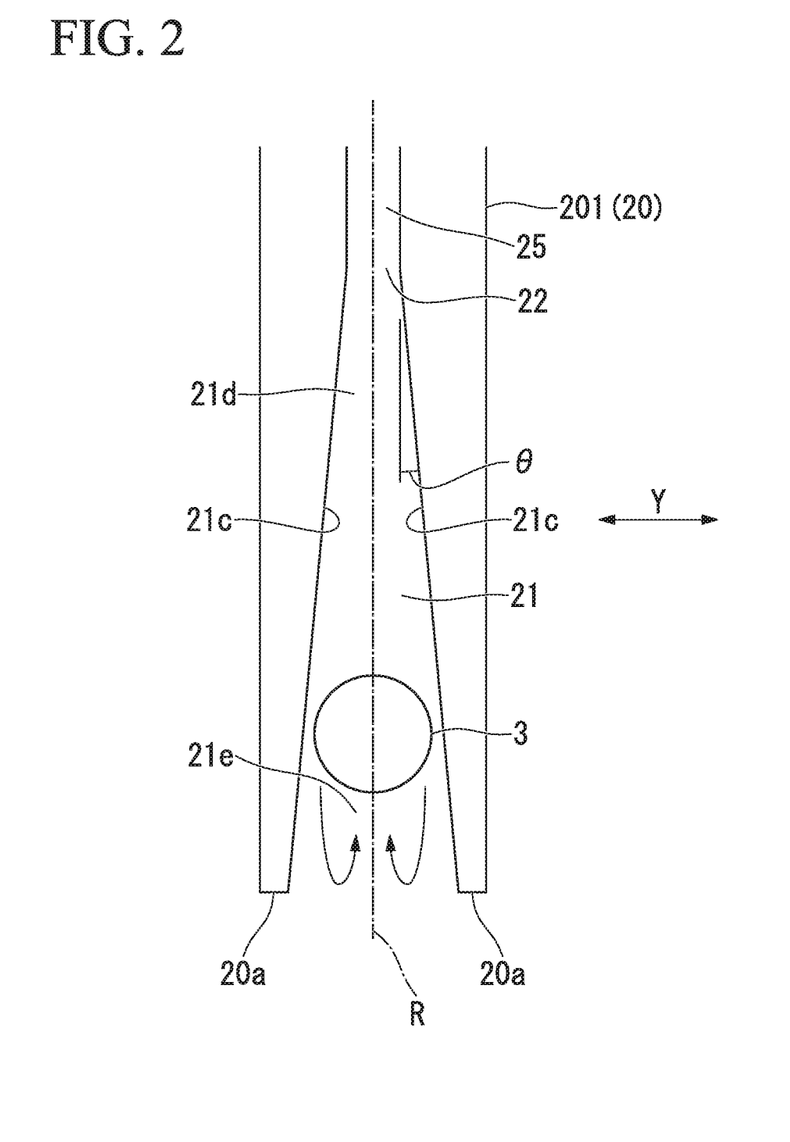
FIG. 2 is a schematic view showing the sectional structure of a direction changing device of the manufacturing apparatus shown in FIG. 1.

As shown in FIG. 2, the direction changing device 201 is configured to discharge the fluid (for example, air) in an internal space portion (fluid accumulation portion 25) ensured in the direction changing device 201 toward the inside of the guide groove 21 through the outlet 22.

The direction changing device 201 may be configured to allow the fluid to be introduced into the fluid accumulation portion 25 from the outside and be discharged to the guide groove 21 through the outlet 22.

As shown in FIG. 3, in the direction changing device 201, it is preferable that an introduction portion 27 to which an introduction path 26 that introduces the fluid to the fluid accumulation portion 25 from the outside is connected is formed. The introduction portion 27 is, for example, an introduction port for the fluid.

As shown in FIG. 2, it is preferable that the guide groove 21 is formed to be inclined with respect to the radial direction R such that the interval (a dimension in the Y direction) between inner side surfaces 21c and 21c gradually increases toward the outside in the radial direction. It is preferable that the two inner side surfaces 21c and 21c have the same inclination angle θ with respect to the radial direction R.

In the direction changing device 201 shown in FIG. 3, the bare optical fiber 3 enters one end 21a of the guide groove 21 having a quadrant shape and exits the other end 21b such that the change in direction by 90° is achieved. A wire entrance portion 23 that the bare optical fiber 3 enters is a portion including the first end 21a of the guide groove 21, and a wire exit portion 24 that the bare optical fiber 3 exits is a portion including the second end 21b of the guide groove 21.

Figure 4:
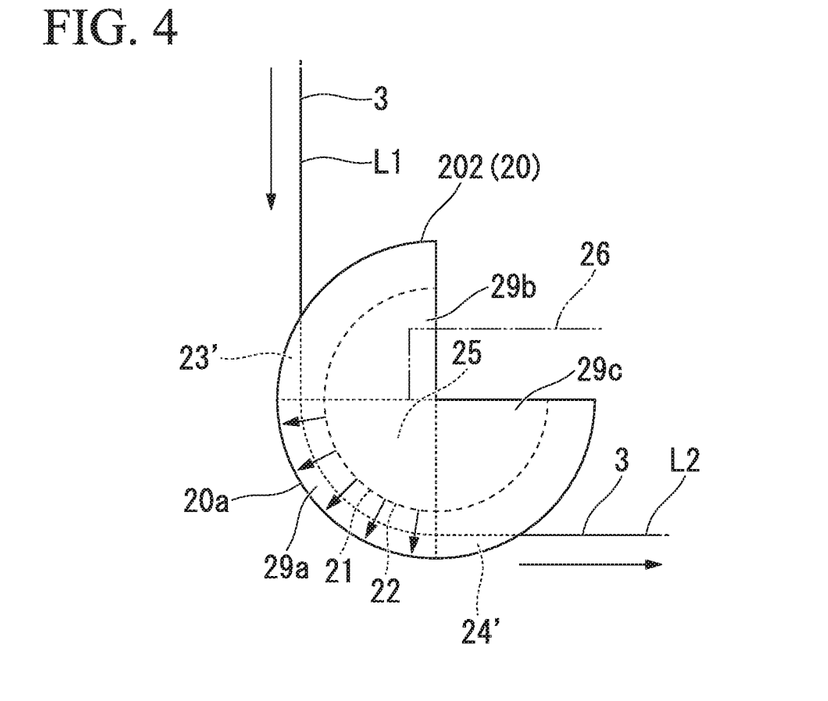
FIG. 4 is a front view showing a modification example of the direction changing device shown in FIG. 3.

A direction changing device 202 shown in FIG. 4 is a modification example of the direction changing device 201 and has a ¾ circle shape in the plan view. Hereinafter, like elements having the same configurations as those of the above-described configuration are denoted by like reference numerals, and a description thereof will be omitted.

The direction changing device 202 has a structure in which, to the wire entrance side and the wire exit side of a body portion 29a having the same structure as that of the direction changing device 201, auxiliary portions 29b and 29c having the same structure as that of the body portion 29a are connected. The direction changing device 202 enters the guide groove 21 of the body portion 29a through a wire entrance portion 23' of the bare optical fiber 3, is changed in direction by 90° in the body portion 29a, then exits a wire exit portion 24'. Therefore, the basic function thereof is the same as that of the direction changing device 201.

The direction changing device 201 or 202 can change the direction of the bare optical fiber 3 by 90° and thus can be used as the direction changing device 20A or 20B shown in FIG. 1.

As shown in FIG. 1, the position detection unit 50 includes a first position detection unit 50A and a second position detection unit 50B.

The first position detection unit 50A is provided on the downstream side in the drawing direction of the second direction changing device 20A, and detects the position of the bare optical fiber 3 on the second path L2.

The second position detection unit 50B is provided on the downstream side in the drawing direction of the second direction changing device 20B, and detects the position of the bare optical fiber 3 on the third path L3.

As the first position detection unit 50A and the second position detection unit 50B, for example, a laser (optical) position sensor may be used. For example, the laser position sensor can receive light that is emitted toward the bare optical fiber 3 from a light source (laser light source) with a detector provided to oppose the light source and can detect the position of the bare optical fiber 3 on the basis of the light.

When the floatation amount of the bare optical fiber 3 in the first direction changing device 20A fluctuates, the position in the Z direction (a direction perpendicular to the X direction and the Y direction) of the bare optical fiber 3 on the second path L2 is changed. Therefore, the first position detection unit 50A can detect the floatation amount (floating position) of the bare optical fiber 3 in the first direction changing device 20A.

When the floatation amount of the bare optical fiber 3 in the second direction changing device 20B fluctuates, the position in the X direction of the bare optical fiber 3 on the third path L3 is changed. Therefore, the second position detection unit 50B can detect the floatation amount of the bare optical fiber 3 in the second direction changing device 20B.

The first position detection unit 50A and the second position detection unit 50B outputs a position signal (detection signal) to the control unit 60 on the basis of the information regarding the position of the bare optical fiber 3 (the result of the detection of the position of the bare optical fiber 3).

The flow rate regulator 70 can regulate the flow rate of the fluid introduced into the direction changing devices 20A and 20B. For example, the flow rate regulators 70 may be provided on introduction paths (for example, the introduction path 26 shown in FIG. 3) on which the fluid is introduced into the direction changing devices 20A and 20B. As the flow rate regulator 70, a mass flow controller (MFC) or the like may be used.

In the manufacturing apparatus 1 shown in FIG. 1, the two flow rate regulators 70 are used. In the two flow rate regulators 70, the flow rate regulator 70 which regulates the flow rate of the fluid introduced into the first direction changing device 20A is referred to as the first flow rate regulator 70A, and the flow rate regulator 70 which regulates the flow rate of the fluid introduced into the second direction changing device 20B is referred to as the second flow rate regulator 70B.

The control unit 60 outputs control signals to the flow rate regulators 70A and 70B on the basis of the position signal from the position detection unit 50 (50A, 50B), and the flow rate regulators 70A and 70B control the flow rate of the fluid introduced into the direction changing devices 20A and 20B on the basis of the control signals, thereby controlling the floatation amount of the bare optical fiber 3 in the direction changing devices 20A and 20B.

The coating unit 30 applies a coating material such as a urethane acrylate-based resin to the outer circumference of the bare optical fiber 3 to form a coating layer, thereby obtaining an optical fiber intermediate body 4.

The resin coating is, for example, a two-layer coating obtained by applying a material for a primary coating layer having a low Young's modulus to the inside and applying a material for a secondary coating layer having a high Young's modulus to the outside.

The material that is used is, for example, a UV-curable resin.

The coating unit 30 may have a configuration in which the primary coating layer and the secondary coating layer are separately applied, or may also have a configuration in which the primary coating layer and the secondary coating layer are simultaneously applied.

The curing unit 40 includes one or a plurality of UV lamps 40a and cures the coating layer of the optical fiber intermediate body 4 to form the optical fiber 5. For example, the curing unit 40 includes the plurality of UV lamps 40a provided with a space interposed therebetween, through which the optical fiber intermediate body 4 passes.

The pulley 80 can change the direction of the optical fiber 5.

The take-up unit 90 is, for example, a take-up capstan, and determines the drawing velocity. The drawing velocity is, for example, 1500 m/min or higher.

The winder 100 is, for example, a winding bobbin for winding the optical fiber 5.

Next, an embodiment of a manufacturing method of an optical fiber of the present invention will be described by exemplifying a case of using the manufacturing apparatus 1.

Drawing Process

As shown in FIG. 1, in the drawing unit 10, the optical fiber preform 2 is heated and the bare optical fiber 3 is formed through drawing.

The outer diameter of the optical fiber preform 2 is, for example, 100 mm or greater, and the length of the optical fiber 5 produced from a single optical fiber preform 2 is, for example, thousands of kilometers.

Change in Direction by Direction Changing Devices

The bare optical fiber 3 drawn vertically downward (the first path L1) from the optical fiber preform 2 is directed horizontally (the second path L2) by being changed in direction by 90° in the first direction changing device 20A.

The bare optical fiber 3 is directed vertically downward (the third path L3) by being changed in direction by 90° in the second direction changing device 20B.

As shown in FIG. 2, in the direction changing devices 20A and 20B, the bare optical fiber 3 can be floated by discharging the fluid (for example, air) in the fluid accumulation portion 25 toward the inside of the guide groove 21 through the outlet 22. Specifically, the difference in pressure between a deep portion 21d and a shallow portion 21e of the guide groove 21 is increased by the discharged air, and thus a radially outward force is exerted on the bare optical fiber 3, thereby floating the bare optical fiber 3.

The direction of the bare optical fiber 3 can be changed by the direction changing devices 20A and 20B without coming into contact with the bare optical fiber 3. The direction changing devices 20A and 20B rarely apply resistance (for example, the rotational resistance of a pulley) unlike a contact direction changing device (for example, pulley).

Since the direction of the bare optical fiber 3 is changed by the direction changing devices 20A and 20B, a distance for sufficiently cooling the bare optical fiber is ensured without increasing the height of the entire system, thereby enhancing productivity.

The first position detection unit 50A outputs the first position signal to the control unit 60 on the basis of the positional information of the bare optical fiber 3 on the second path L2. The first position signal is a signal corresponding to the position in the Z direction of the bare optical fiber 3 in the guide groove 21 in the first direction changing device 20A.

The second position detection unit 50B outputs the second position signal to the control unit 60 on the basis of the positional information of the bare optical fiber 3 on the third path L3. The second position signal is a signal corresponding to the position in the X direction of the bare optical fiber 3 in the guide groove 21 in the second direction changing device 20B.

The control unit 60 outputs the control signals to the first flow rate regulator 70A on the basis of the first position signal and controls the flow rate of the fluid introduced into the first direction changing device 20A on the basis of the control signals. Accordingly, by controlling the flow velocity of the fluid discharged from the outlet 22 to the guide groove 21 in the first direction changing device 20A, the floatation amount of the bare optical fiber 3 in the first direction changing device 20A is regulated.

The control unit 60 outputs the control signals to the second flow rate regulator 70B on the basis of the second position signal, and the second flow rate regulator 70B controls the flow rate of the fluid introduced into the second direction changing device 20B on the basis of the control signals. Accordingly, by controlling the flow velocity of the fluid discharged from the outlet 22 to the guide groove 21 in the second direction changing device 20B, the floatation amount of the bare optical fiber 3 in the second direction changing device 20B is regulated.

For example, in a case where the drawing tension is constant, the floatation amount of the bare optical fiber 3 increases as the flow velocity of the fluid at the direction changing devices 20A and 20B increases, and the floatation amount of the bare optical fiber 3 decreases as the flow velocity of the fluid decreases. In a case where the flow velocity of the fluid is constant, the floatation amount of the bare optical fiber 3 decreases as the drawing tension increases, and the floatation amount of the bare optical fiber 3 increases as the drawing tension decreases.

When the floatation amount is increased, a floating position of the bare optical fiber 3 is unstable and the variation of the floating position is likely to increase. On the other hand, when the floatation amount is decreased, a floating position of the bare optical fiber 3 is unstable and the variation of the floating position is likely to increase.

The control unit 60 regulates the flow rate of the fluid introduced into the direction changing devices 20A and 20B when the floating position of a bare optical fiber 3 is deviated and the variation (standard deviation $\sigma$) of the floatation amount is greater than the variation in the reference floating position on the basis of, for example, the floating position (reference floating position) at the predetermined drawing velocity and drawing tension. Accordingly, the flow velocity of the fluid discharged from the outlet 22 to the guide groove 21 is adjusted and the floatation amount of the bare optical fiber 3 is adjusted. A detailed description is provided below.

First, an example of a method of determining a reference floating position is described.

Figure 5:
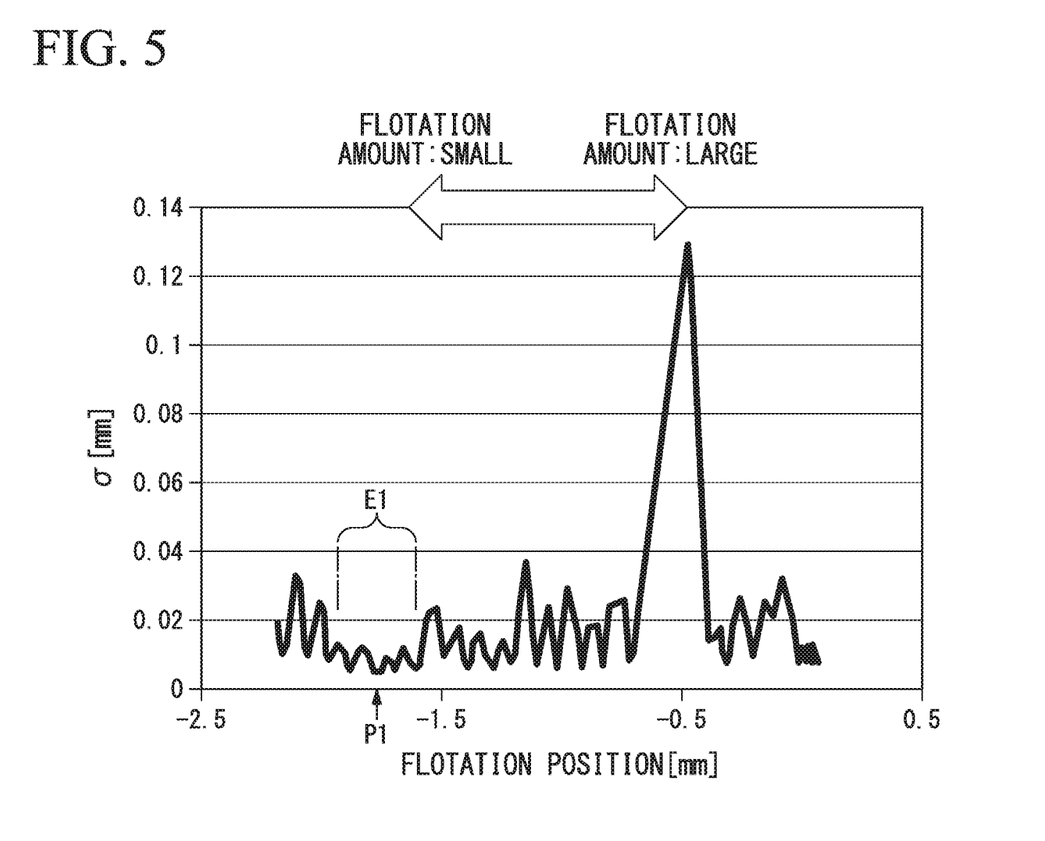
FIG. 5 is a graph showing experimental results.

FIG. 5 is a graph showing a relationship between the standard deviation $\sigma$ of the floatation amount of the bare optical fiber in a reference drawing condition and an average floating position at a constant time. Since the standard deviation $\sigma$ of the floatation amount is an index of the variation of the floatation amount, the floatation becomes stable as the standard deviation $\sigma$ is reduced. The floating position shows a position in a radial direction (radial position) in the direction changing devices.

The reference drawing condition is defined by the predetermined drawing velocity (reference drawing velocity), the predetermined drawing tension (reference drawing tension), and the like. For example, as a reference drawing condition, the drawing velocity of 30 m/s, the drawing tension of 150 gf, the outer diameter of the bare optical fiber 3 of 125 µm and the like can be employed.

The floating position where the standard deviation $\sigma$ of the floatation amount is a minimum can be a reference floating position. For example, in FIG. 5, a position where the standard deviation $\sigma$ of the floatation amount is a minimum is "P1" (the floating position: −1.79 mm), and the position p1 can be a reference floating position.

The reference floating position can be defined on the basis of an average value of the standard deviation $\sigma$ in a partial range in the radial direction in the direction changing devices. For example, in FIG. 5, the average value of the standard deviation $\sigma$ in the range E1 (the floating position: −1.94 mm to −1.64 mm) is lower than in other ranges having the same width. The position p1 which is a center value (or a minimum value) of the range E1 can be defined as "a reference floating position". In addition, the range E1 may be defined as "a reference floating position".

The standard deviation $\sigma$ in the range E1 is smaller than a standard deviation $\sigma$ in other ranges having the same width where an average floating position is smaller than in the range E1 and a standard deviation $\sigma$ in other ranges where an average floating position is greater than in the range E1. Therefore, the range E1 can be a range where the standard deviation $\sigma$ is a minimum.

The reference floating position becomes reproducibly constant when manufacturing conditions (drawing velocity, drawing tension, an outer diameter of the bare optical fiber, and the like) are constant in the same direction changing device. The reference floating position can be determined by the preliminary test.

The floating position can be variable by the manufacturing conditions since the position depends on an installed location of the position detection unit; however, the position can be compared mutually under the same conditions.

Next, a controlling method when the floating position of a bare optical fiber 3 is deviated from the reference floating position is described.

Due to the changes of the drawing conditions (drawing velocity, drawing tension, and the like) from the reference drawing conditions, the floating position of a bare optical fiber 3 may be deviated from the reference floating position. In this case, a position signal output from the position detection unit 50 is changed. The position signal is input to the control unit 60, and the control unit 60 calculates the standard deviation $\sigma$ every predetermined setting time.

The feedback control can be fast as the setting time is shorter; however, the number of calculated data is also smaller and a calculation error becomes greater. On the other hand, the time is longer, the feedback is slower which is not preferable.

Therefore, the setting time is preferably selected in consideration of the reference drawing conditions. For example, the datum of the floating position of the bare optical fiber 3 is obtained in every 10 msec, and the data processing is performed in every 10 sec (i.e., every 1000 data). Thereby, the standard deviation σ can be determined.

As a standard of the variation of the floating position, it is not limited to a standard deviation. Dispersion or a variation coefficient can also be employed.

In a case where the floatation amount of the bare optical fiber 3 becomes greater than the floatation amount at the reference floating position and the variation (standard deviation σ) of the floatation amount is greater than the variation at the reference floating position, the control unit 60 decreases the flow rate of the fluid introduced into the direction changing devices 20A and 20B using the flow rate regulators 70A and 70B. Accordingly, the deviation between the floatation amount of the bare optical fiber 3 and the floatation amount at the reference floating position is reduced.

By decreasing the flow rate of the fluid introduced into the direction changing devices 20A and 20B, the flow velocity of the fluid discharged from the outlet 22 to the guide groove 21 can be reduced, the floatation amount of the bare optical fiber 3 can be suppressed, and the variation of the floatation amount can be reduced.

On the other hand, in a case where the floatation amount of the bare optical fiber 3 becomes smaller than the floatation amount at the reference floating position and the variation of the floatation amount is greater than the variation at the reference floating position, the control unit 60 increases the flow rate of the fluid introduced into the direction changing devices 20A and 20B using the flow rate regulators 70A and 70B. Accordingly, the deviation between the floatation amount of the bare optical fiber 3 and the reference floating position is reduced.

By increasing the flow rate of the fluid introduced into the direction changing devices 20A and 20B, the flow velocity of the fluid discharged from the outlet 22 to the guide groove 21 is increased, and an insufficient floatation amount of the bare optical fiber 3 is prevented as well as the variation of the floatation amount can be reduced.

As a control method, feedback control such as PID control is preferable. Accordingly, the flow rate of the fluid can be controlled with good responsiveness.

Coating Process

In the coating unit 30, the outer circumference of the bare optical fiber 3 is coated with a coating material such as a urethane acrylate-based resin to form the coating layer, thereby obtaining the optical fiber intermediate body 4.

Curing Process

In the curing unit 40, the coating layer of the optical fiber intermediate body 4 is cured by being irradiated by the UV lamps 40a, thereby obtaining the optical fiber 5.

The optical fiber 5 is changed in direction by the pulley 80, is taken up by the take-up unit 90, and is wound by the winder 100.

In the manufacturing method of the present embodiment, the detected floating position and the predetermined reference floating position are compared and the flow rate of the fluid introduced into the direction changing devices 20 is controlled so as to reduce the difference between the detected floating position and the predetermined reference floating position. Therefore, the floatation amount of the bare optical fiber 3 can be adjusted, and variation of the floatation amount can be reduced.

In detail, in the floatation amount of the bare optical fiber 3, there are large variation of the floatation amount due to the variation of the drawing tension and fine variation of the floatation amount due to fine oscillation of the bare optical fiber 3. In the manufacturing method of the present embodiment, both of the two variations of the floatation amount can be reduced by controlling the flow rate of the introduced fluid.

Therefore, the contact between the bare optical fiber 3 and the inner side surface 21c of the guide groove 21 can be avoided.

Therefore, the bare optical fiber 3 is not damaged by the direction changing devices 20A and 20B, and the operation ratio of the manufacturing apparatus 1 is increased, resulting in the enhancement of productivity. Therefore, a reduction in manufacturing costs can be achieved. In addition, the optical fiber 5 can be manufactured with a good yield.

Furthermore, the floating position of the bare optical fiber 3 in the direction changing devices 20A and 20B becomes stable, and thus the position of the bare optical fiber 3 that enters the coating unit 30 becomes constant. Therefore, the coating is prevented from having an uneven thickness, and the optical fiber 5 with stable quality can be manufactured.

EXAMPLE

Example 1

The manufacturing apparatus 1 shown in FIG. 1 was prepared. As the direction changing devices 20A and 20B, the direction changing device 201 shown in FIG. 3 was used.

As shown in FIG. 2, the inclination angle θ of the inner side surface 21c of the guide groove 21 with respect to the radial direction R was set to 0.5°. The width of the bottom of the guide groove 21 was set to 50 μm.

As the fluid introduced into the direction changing devices 20A and 20B, air was used.

In a preliminary test, the datum of the floating position of the bare optical fiber 3 is obtained in every 10 msec, and the data processing is performed in every 10 sec (i.e., every 1000 data). As a result, a reference floating position at the first direction changing device 20A was a position of a floating turning radius of 62.0 mm, and at this position, a standard deviation σ was a minimum value of 0.01 mm. A flow rate of the introduced air was 120 SLM. The reference floating position at the second direction changing device 20B was a position of a floating turning radius of 62.5 mm, and at this position, a standard deviation σ was a minimum value of 0.01 mm. A flow rate of the introduced air was 130 SLM.

The first direction changing device 20A was provided at a position at which the temperature of the bare optical fiber 3 reached approximately 1000° C. The second direction changing device 20B was provided at a position separated by 1 m from the first direction changing device 20A on the downstream side in the drawing direction.

The bare optical fiber 3 (with an outer diameter of 125 μm) was obtained through drawing of the optical fiber preform 2 in the drawing unit 10.

The bare optical fiber 3 drawn vertically downward (the first path L1) from the optical fiber preform 2 was changed in direction to a horizontal direction (the second path L2) by the first direction changing device 20A, and was thereafter changed in direction to a vertically downward direction (the third path L3) by the second direction changing device 20B.

In the coating unit 30, the bare optical fiber 3 was coated with the UV-curable resin, and the coating layer was cured by being irradiated with UV light by the UV lamps 40a in the curing unit 40, thereby obtaining the optical fiber 5.

The optical fiber 5 was wound by the winder 100 via the pulley 80 and the take-up unit 90.

When the floating position of the bare optical fiber 3 became greater than the reference floating position and the standard deviation σ of the floatation amount was greater than the standard deviation σ at the reference floating position, the control unit 60 decreased the flow rate of the fluid introduced into the direction changing devices 20A and 20B using the flow rate regulators 70A and 70B. Accordingly, the flow velocity of the fluid discharged from the outlet 22 to the guide groove 21 was reduced, the floatation amount of the bare optical fiber 3 was suppressed, and the variation of the floatation amount was reduced.

When the floating position of the bare optical fiber 3 became smaller than the reference floating position and the standard deviation σ of the floatation amount was greater than the standard deviation σ at the reference floating position, the control unit 60 increased the flow rate of the fluid introduced into the direction changing devices 20A and 20B using the flow rate regulators 70A and 70B. Accordingly, the flow velocity of the fluid discharged from the outlet 22 to the guide groove 21 was increased, the floatation amount of the bare optical fiber 3 was increased, and the variation of the floatation amount was reduced.

As the control method, PID control was employed.

By the manufacturing method described above, the optical fiber 5 having a total length of 10,000 km was manufactured by using 10 optical fiber preforms 2.

The linear velocity (drawing velocity) of the optical fiber 5 was 30 m/s±1 m/s, and the drawing tension was 150±25 gf.

In the direction changing devices 20A and 20B, there was no significant variation in the floating turning radius of the bare optical fiber 3, and the bare optical fiber 3 was stably floated.

In the manufacturing method, the optical fiber 5 was manufactured, and a proof test was conducted. As a result, it was confirmed that the optical fiber 5 could be manufactured with a good yield without damaging the bare optical fiber 3 by the direction changing devices 20A and 20B.

Comparative Example 1

The flow rate of the air introduced into the first direction changing device 20A was a constant value (120 SLM) and the flow rate of the air introduced into the second direction changing device 20B was a constant value (130 SLM), and the optical fiber 5 was manufactured. The other conditions were similar to those of Example 1.

The drawing velocity of the optical fiber 5 was 30 m/s±1 m/s, and the drawing tension was 150 gf±25 gf. When the drawing tension varied, a variation in the floatation amount of the bare optical fiber 3 was seen.

As a result of a proof test, breaking of the bare optical fiber 3, which was thought to be caused by the contact between the bare optical fiber 3 and the inner side surface of the guide groove, had occurred. Therefore, it could not be said that a good manufacturing yield was achieved.

While the manufacturing method and the manufacturing apparatus of the optical fiber of the present invention have been described above, the present invention is not limited to the examples described above, and can be appropriately modified without departing from the spirit of the present invention.

For example, the number of direction changing devices used in the manufacturing method of the optical fiber of the present invention may be one or more. The two direction changing devices 20 are used in the manufacturing apparatus 1 shown in FIG. 1. However, the number of direction changing devices 20 may be one or an arbitrary number of three or more.

In a case where a plurality of direction changing devices is present, the position of the bare optical fiber is detected by at least one of the plurality of direction changing devices. The position of the bare optical fiber may be detected by all of the plurality of direction changing devices or some direction changing devices among the plurality of direction changing devices.

The flow rate of the introduced fluid is controlled preferably by all of the plurality of direction changing devices, but may also be controlled by some direction changing devices among the plurality of direction changing devices. The flow rate of the introduced fluid is controlled preferably by at least the direction changing device closest to the downstream side.

In addition, the direction changing device can be disposed at any position between the heating furnace and coating unit.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A control device comprising:
   one or a plurality of non-contact holding portions which hold a bare optical fiber at any position between a drawing unit and a coater of a manufacturing apparatus of an optical fiber,
   a position detector which detects a floating position of the bare optical fiber in the one or a plurality of non-contact holding portions; and
   a controller which controls a flow rate of a fluid introduced into the one or a plurality of non-contact holding portions on a basis of the floating position detected by the position detector,
   wherein the one or a plurality of non-contact holding portions comprises a guide groove which guides the bare optical fiber and an internal space portion into which the fluid is introduced from outside,
   wherein in the guide groove, an outlet through which the fluid in the internal space portion is blown to float the bare optical fiber in the guide groove is formed,
   wherein the controller detects the floating position of the bare optical fiber at at least one of the one or a plurality of non-contact holding portions, compares the detected floating position with a predetermined reference floating position, and controls a flow rate of the fluid introduced into the one or a plurality of non-contact holding portions so as to reduce a difference between the detected floating position and the predetermined reference floating position, and
   wherein the predetermined reference floating position is a floating position where a standard deviation of a floatation amount of the bare optical fiber that is an index of a variation of the floatation amount is a minimum, and the predetermined reference floating position is determined by a preliminary test by the control device such that calculating an average value of the standard deviation in a partial range in a radial direction in the one or a plurality of non-contact holding portions and determining a minimum value of the average value of the standard deviation.

2. The control device according to claim 1, wherein when the floatation amount of the bare optical fiber becomes greater than a floatation amount at a reference floating position and a standard deviation of the floatation amount of the bare optical fiber is greater than a standard deviation at the reference floating position, the controller decreases a flow rate of the fluid introduced into the one or a plurality of non-contact holding portions.

3. The control device according to claim 1, wherein when the floatation amount of the bare optical fiber becomes smaller than a floatation amount at a reference floating position and a standard deviation of the floatation amount of the bare optical fiber is greater than a standard deviation at the reference floating position, the controller increases a flow rate of the fluid introduced into the one or a plurality of non-contact holding portions.

4. A manufacturing apparatus of an optical fiber comprising:
a drawing unit which draws an optical fiber preform and forms a bare optical fiber;
a coater which coats an outer circumference of the bare optical fiber with a coating layer comprising a resin; and
a control device comprising:
one or a plurality of non-contact holding portions which hold the bare optical fiber at any position between the drawing unit and the coater,
a position detector which detects a floating position of the bare optical fiber in the one or a plurality of non-contact holding portions; and
a controller which controls a flow rate of a fluid introduced into the one or a plurality of non-contact holding portions on a basis of the floating position detected by the position detector,
wherein the one or a plurality of non-contact holding portions comprises a guide groove which guides the bare optical fiber and an internal space portion into which the fluid is introduced from the outside,
wherein in the guide groove, an outlet through which the fluid in the internal space portion is blown to float the bare optical fiber in the guide groove is formed, and
wherein the controller detects the floating position of the bare optical fiber at at least one of the one or a plurality of non-contact holding portions, compares the detected floating position with a predetermined reference floating position, and controls a flow rate of the fluid introduced into the one or a plurality of non-contact holding portions so as to reduce a difference between the detected floating position and the predetermined reference floating position, and
wherein the predetermined reference floating position is a floating position where a standard deviation of a floatation amount of the bare optical fiber that is an index of a variation of the floatation amount is a minimum, and the predetermined reference floating position is determined by a preliminary test by the control device such that calculating an average value of the standard deviation in a partial range in a radial direction in the one or a plurality of non-contact holding portions and determining a minimum value of the average value of the standard deviation.

* * * * *